United States Patent
Xiao et al.

(10) Patent No.: US 11,245,886 B2
(45) Date of Patent: Feb. 8, 2022

(54) METHOD AND APPARATUS FOR SYNTHESIZING OMNI-DIRECTIONAL PARALLAX VIEW, AND STORAGE MEDIUM

(71) Applicant: Beijing Xiaomi Pinecone Electronics Co., Ltd., Beijing (CN)

(72) Inventors: Chunxia Xiao, Beijing (CN); Fei Luo, Beijing (CN); Wenjie Li, Beijing (CN); Liheng Zhou, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 0 days.

(21) Appl. No.: 17/027,059

(22) Filed: Sep. 21, 2020

(65) Prior Publication Data

US 2021/0321071 A1 Oct. 14, 2021

(30) Foreign Application Priority Data

Apr. 8, 2020 (CN) .......................... 202010268198.7

(51) Int. Cl.
*H04N 13/111* (2018.01)
*G06T 7/593* (2017.01)
*H04N 13/00* (2018.01)

(52) U.S. Cl.
CPC ............ *H04N 13/111* (2018.05); *G06T 7/593* (2017.01); *G06T 2207/10012* (2013.01); *G06T 2207/20081* (2013.01); *G06T 2207/20084* (2013.01); *H04N 2013/0081* (2013.01)

(58) Field of Classification Search
CPC .......... H04N 13/111; H04N 2013/0081; G06T 7/593; G06T 2207/10012; G06T 2207/20081; G06T 2207/20084

USPC ........................................................... 348/43
See application file for complete search history.

(56) References Cited

U.S. PATENT DOCUMENTS

| 2013/0050412 A1 | 2/2013 | Shinohara et al. |
| 2014/0147031 A1 | 5/2014 | Rzeszutek et al. |
| 2017/0041588 A1* | 2/2017 | Yamazaki ......... H01L 27/14627 |
| 2019/0028643 A1* | 1/2019 | Oryoji ................ H04N 5/23238 |

FOREIGN PATENT DOCUMENTS

| CN | 101662695 A | 3/2010 |
| CN | 102075779 A | 5/2011 |
| CN | 102790895 A | 11/2012 |

(Continued)

OTHER PUBLICATIONS

Extended European Search Report in European application No. 20199612.1, dated Mar. 12, 2021.

(Continued)

*Primary Examiner* — Allen C Wong
(74) *Attorney, Agent, or Firm* — Finnegan, Henderson, Farabow, Garrett & Dunner, L.L.P.

(57) ABSTRACT

A method for synthesizing an omni-directional parallax view includes: obtaining parallaxes between an original image data pair, wherein the parallaxes include a horizontal parallax and a vertical parallax; determining a target viewpoint based on a base line between the original image data pair; obtaining a target pixel of the target viewpoint in original image data based on the horizontal parallax and the vertical parallax; and synthesizing a target view of the target viewpoint based on the target pixel.

20 Claims, 10 Drawing Sheets

(56) References Cited

FOREIGN PATENT DOCUMENTS

| CN | 107493465 A | 12/2017 |
| JP | H02101584 A | 4/1990 |
| JP | H1013860 A | 1/1998 |
| JP | 2011070579 A | 4/2011 |
| JP | 2013143702 A | 7/2013 |
| KR | 20080000149 A | 1/2008 |
| KR | 20160018224 A | 2/2016 |

OTHER PUBLICATIONS

Dong Tian et al.: "View synthesis techniques for 3D video", Applications of Digital Image Processing XXXII, vol. 7443, 74430T, Sep. 2, 2009.

Changhee Won et al.: "SweepNet: Wide-baseline Omnidirectional Depth Estimation", arxiv. org, Cornell University Library, 201 Olin Library Cornell University, Ithaca, NY 14853, Aug. 16, 2019.

Attal Benjamin et al: "MatryODShka: Real-time 6DoF Video View Synthesis Using Multi-sphere Images", Aug. 23, 2020, Lecture Notes in Computer Science, pp. 441-459.

First Office Action of Chinese Application No. 202010268198.7, dated Jul. 5, 2021.

Notice of Reasons for Refusal for Japanese Patent Application No. 2020-160472, dated Nov. 26, 2021.

Park, Ji-Won, et al., "Implementation of Improved Scale-invariant Loss Function for Predicting Disparity-Maps of Stereo Images Using Deep-learning", The Institute of Electronics and Information Engineers, Nov. 2017, pp. 592-594.

\* cited by examiner

| Layer | Input | Kernal | Stride | Act |
|---|---|---|---|---|
| C1 | Stereo | 7×7×32 | 2 | Relu |
| C1b | C1 | 7×7×32 | 1 | Relu |
| C2 | C1b | 5×5×64 | 2 | Relu |
| C2b | C2 | 5×5×64 | 1 | Relu |
| C3 | C2b | 3×3×128 | 2 | Relu |
| C3b | C3 | 3×3×128 | 1 | Relu |
| C4 | C3b | 3×3×256 | 2 | Relu |
| C4b | C4 | 3×3×256 | 1 | Relu |
| C5 | C4b | 3×3×512 | 2 | Relu |
| C5b | C5 | 3×3×512 | 1 | Relu |
| C6 | C5b | 3×3×512 | 2 | Relu |
| C6b | C6 | 3×3×512 | 1 | Relu |
| C7 | C6b | 3×3×512 | 2 | Relu |
| C7b | C7 | 3×3×512 | 1 | Relu |
| D7 | C7b | 3×3×512 | 2 | Relu |
| I7 | [D7,C6b] | 3×3×512 | 1 | Relu |
| D6 | I7 | 3×3×512 | 2 | Relu |
| I6 | [D6,C5b] | 3×3×512 | 1 | Relu |
| D5 | I6 | 3×3×256 | 2 | Relu |
| I5 | [D5,C4b] | 3×3×256 | 1 | Relu |
| D4 | I5 | 3×3×128 | 2 | Relu |
| I4 | [D4,C3b] | 3×3×128 | 1 | Relu |
| Disp4 | I4 | 3×3×2 | 1 | Tanh |
| D3 | I4 | 3×3×64 | 2 | Relu |
| I3 | [D3,C2b,Disp4↑] | 3×3×64 | 1 | Relu |
| Disp3 | I3 | 3×3×2 | 1 | Tanh |
| D2 | I3 | 3×3×32 | 2 | Relu |
| I2 | [D2,C1b,Disp3↑] | 3×3×32 | 1 | Relu |
| Disp2 | I2 | 3×3×2 | 1 | Tanh |
| D1 | I2 | 3×3×16 | 2 | Relu |
| I1 | [D1,Disp2↑] | 3×3×16 | 1 | Relu |
| Disp1 | I1 | 3×3×2 | 1 | Tanh |

FIG. 6

METHOD AND APPARATUS FOR SYNTHESIZING OMNI-DIRECTIONAL PARALLAX VIEW, AND STORAGE MEDIUM

CROSS-REFERENCE TO RELATED APPLICATION

This application is based upon and claims priority to Chinese Patent Application No. 202010268198.7 filed on Apr. 8, 2020, the entire contents of which are incorporated herein by reference.

TECHNICAL FIELD

The disclosure relates to the technical field of imaging, in particular to a method and apparatus for synthesizing an omni-directional parallax view, and a storage medium.

BACKGROUND

With development of imaging technologies, view synthesis technologies have been applied to more and more fields, such as virtual displaying, teleconferencing, 3D object reconstruction and video frame prediction. Among related technologies, there are a flow-based view synthesis method, a view synthesis method based on a probability model, and a view synthesis method based on depth or parallax information.

However, views synthesized based on parallaxes are not applicable to natural complex scenes, and machine learning is not robust enough, resulting in a poor synthesis effect.

SUMMARY

According to a first aspect of the embodiments of the disclosure, a method for synthesizing an omni-directional parallax view may include: obtaining parallaxes between an original image data pair, wherein the parallaxes include a horizontal parallax and a vertical parallax; determining a target viewpoint based on a base line between the original image data pair; obtaining a target pixel of the target viewpoint in original image data based on the horizontal parallax and the vertical parallax; and synthesizing a target view of the target viewpoint based on the target pixel.

According to a second aspect of the embodiments of the disclosure, an apparatus for synthesizing an omni-directional parallax view may include: a processor; and a memory configured to store instructions executable by the processor. The processor is configured to obtain parallaxes between an original image data pair, wherein the parallaxes include a horizontal parallax and a vertical parallax; determine a target viewpoint based on a base line between the original image data pair; obtain a target pixel of the target viewpoint in original image data based on the horizontal parallax and the vertical parallax; and synthesize a target view of the target viewpoint based on the target pixel.

According to a third aspect of the embodiments of the disclosure, a non-transitory computer readable storage medium has stored therein instructions that, when executed by a processor of a device, cause the device to perform the method for synthesizing an omni-directional parallax view according to the first aspect.

It should be understood that the above general description and the following detailed description are exemplary and explanatory only, and are not intended to limit the disclosure.

BRIEF DESCRIPTION OF THE DRAWINGS

The drawings herein, which are incorporated in and constitute a part of the specification, illustrate embodiments consistent with the disclosure, and serve to explain the principles of the disclosure together with the specification.

FIG. 6 is a schematic diagram of constructing a framework structure of a deep neural network (DispNet), according to an exemplary embodiment.

DETAILED DESCRIPTION

Exemplary embodiments will be described in detail herein, examples of which are illustrated in the accompanying drawings. When the following description refers to the accompanying drawings, the same numbers in different accompanying drawings represent the same or similar elements unless otherwise indicated. The implementations described in the following exemplary embodiments do not represent all implementations consistent with the disclosure. Rather, they are merely examples of apparatuses and methods consistent with some aspects of the disclosure as recited in the appended claims.

Embodiments of the present disclosure provide a method for synthesizing an omni-directional parallax view. In the method, parallaxes between a horizontal direction and a vertical direction of original image pairs may be respectively obtained, corresponding pixels in original images may be determined based on the parallaxes between the horizontal direction and the vertical direction. The method is applicable to complex natural scenes and has an improved synthesis effect.

Figure 1:
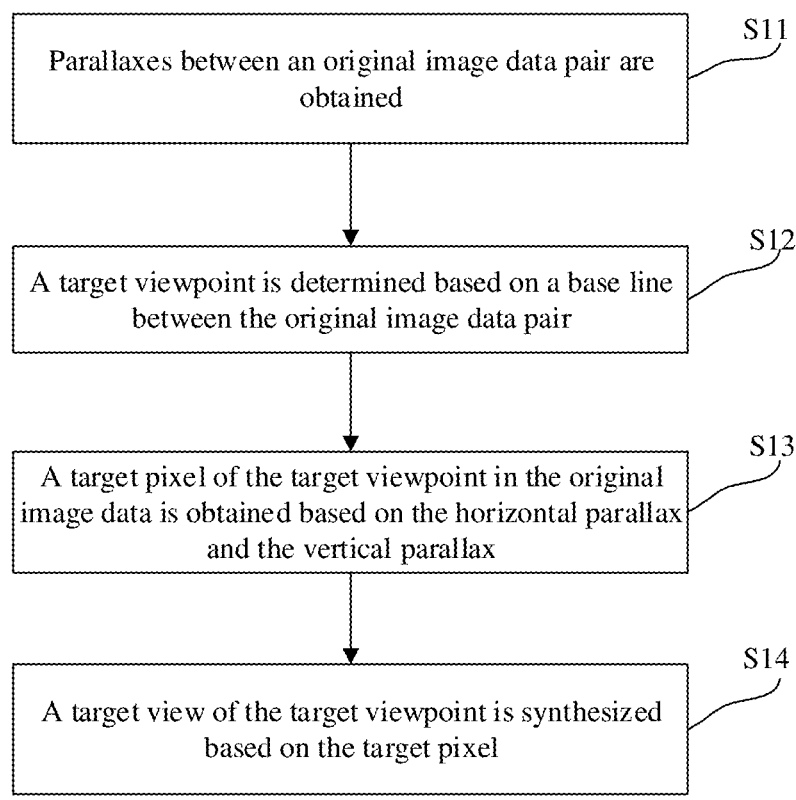
FIG. 1 is a flowchart illustrating a method for synthesizing an omni-directional parallax view according to an exemplary embodiment.

FIG. 1 is a flowchart illustrating a method for synthesizing an omni-directional parallax view according to an exemplary embodiment. As shown in FIG. 1, the method for synthesizing an omni-directional parallax view includes the following operations.

In operation S11, parallaxes between an original image data pair are obtained.

The parallaxes may include a horizontal parallax and a vertical parallax. In the embodiment, the horizontal parallax is denoted by $DISP_h$, and the vertical parallax is denoted by $DISP_v$.

Figure 2:
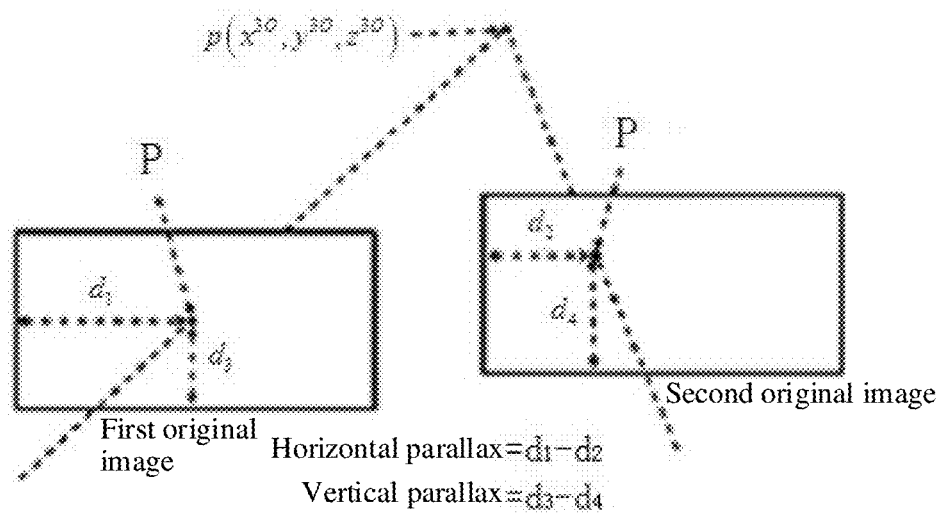
FIG. 2 is a schematic diagram of an original image data pair of the same object shot according to different viewpoints, according to an exemplary embodiment.

The original image data pair may be obtained. The original image data pair may include a first original image and a second original image. The first original image and the second original image may be captured for a same object shot at different viewpoints and constitute the original image data pair. As shown in FIG. 2, according to pixel coordinates of the first original image and the second original image, it may be determined that the pixel coordinates of the second original image correspond to the pixel coordinates of the first original image, and a horizontal parallax and a vertical parallax between the two pixel coordinates may be determined.

Referring back to FIG. 1, in operation S12, a target viewpoint is determined based on a base line between the original image data pair.

The base line may be a connecting line of two shooting points between the original image data pair. The target viewpoint is any point on the base line between the original image data pair.

In operation S13, a target pixel of the target viewpoint in the original image data is obtained based on the horizontal parallax and the vertical parallax.

After the target viewpoint is determined, a coordinate value of the target viewpoint under the pixel coordinates may be obtained. Coordinates of a pixel of the target viewpoint in the first original image may be determined based on a coordinate value of the target viewpoint and the obtained horizontal parallax and vertical parallax, and a corresponding pixel may be obtained based on the determined coordinates of the pixel of the target viewpoint in the first original image.

In operation S14, a target view of the target viewpoint is synthesized based on the target pixel.

The target view may include a plurality of pixels. After all the pixels are obtained based on the first original image, the target view may be synthesized based on the target pixel.

In the above method, the pixel corresponding to the pixel of the target viewpoint in the original image data determined based on the horizontal parallax and the vertical parallax may improve the accuracy of determining the pixel corresponding to the pixel of the target viewpoint in the original image data, and further improve the accuracy of the target view.

Figure 3:
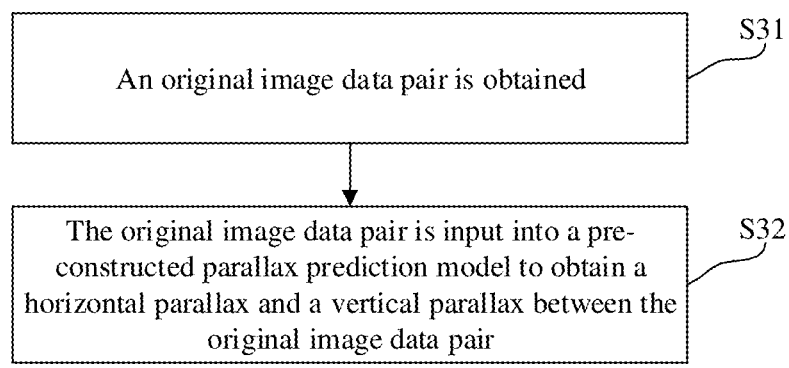
FIG. 3 is a flowchart illustrating a method for synthesizing an omni-directional parallax view according to an exemplary embodiment.

FIG. 3 is a flowchart illustrating a method for synthesizing an omni-directional parallax view according to an exemplary embodiment. As shown in FIG. 3, the obtaining parallaxes between an original image data pair in operation S11 (FIG. 1) includes operation S31 and operation S32.

In operation S31, the original image data pair is obtained.

In operation S32, the original image data pair is input into a pre-constructed parallax prediction model to obtain a horizontal parallax and a vertical parallax between the original image data pair.

Figure 4:
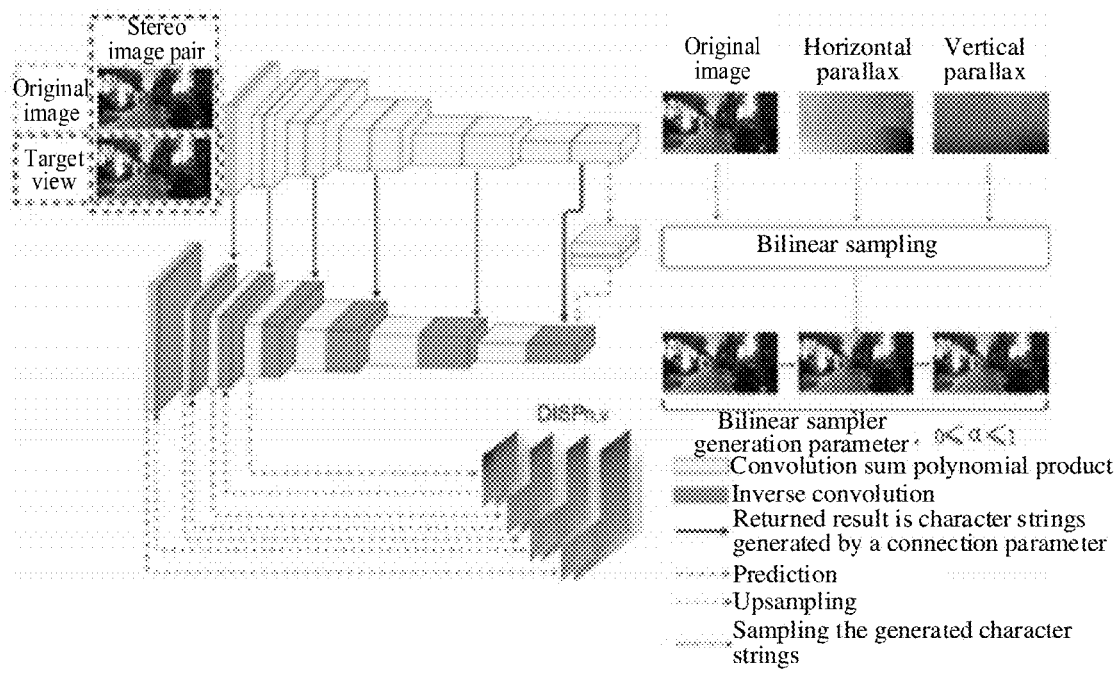
FIG. 4 is a schematic diagram of predicting a parallax according to input original image data, according to an exemplary embodiment.

The original data pair, including a first original image and a second original image shot at different viewpoints, may be obtained. The obtained first original image and second original image may be input into the pre-constructed parallax prediction model to obtain the horizontal parallax and the vertical parallax between the first original image and the second original image. As shown in FIG. 4, in the parallax prediction model, the original image data pair of stereo images of the same object shot at different viewpoints is input. According to a neural network of the parallax prediction model, convolution operation including convolution upsampling and convolution downsampling may be performed on original image data. A parameter α may be generated through a bilinear sampler. The value range of α is 0≤α≤1, and the parameter α is used to determine the first original image or the second original image closer to the original image data of the target viewpoint. The parameter may be added into the parallax prediction model to obtain parallax images in the horizontal direction and the vertical direction.

In an embodiment, the parallax prediction model may be constructed in the following manners.

Figure 5:
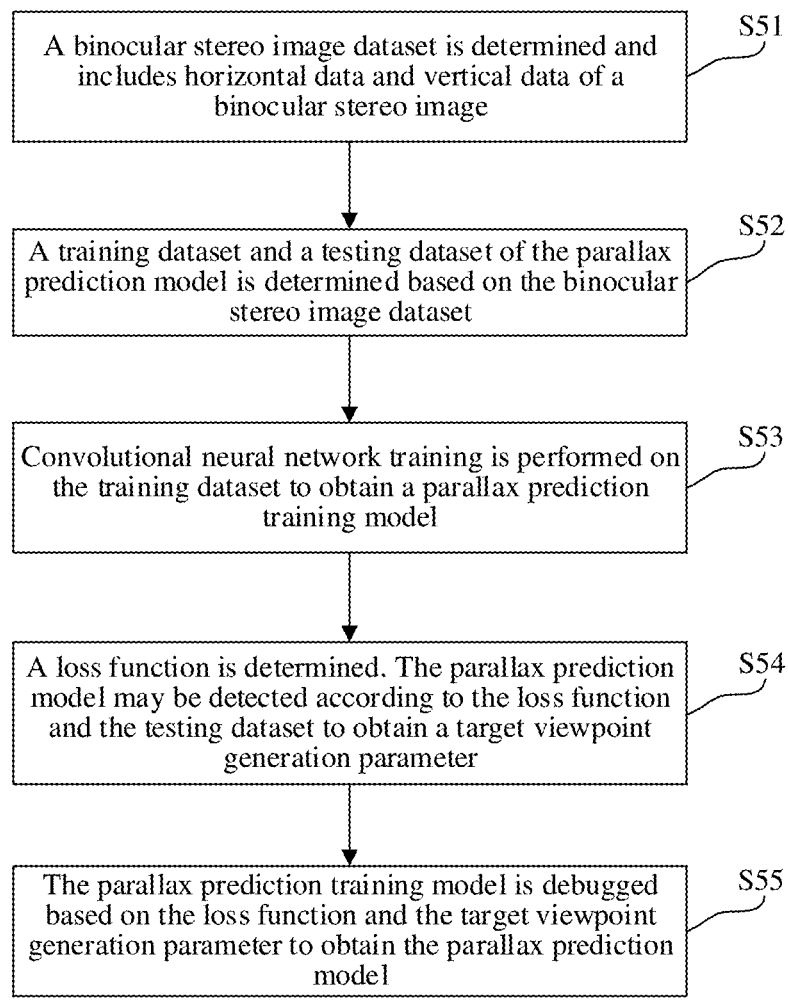
FIG. 5 is a flowchart illustrating a method for synthesizing an omni-directional parallax view according to an exemplary embodiment.

FIG. 5 is a flowchart illustrating a method for synthesizing an omni-directional parallax view according to an exemplary embodiment. As shown in FIG. 5, a method for constructing the parallax prediction model includes operation S51 to operation S55.

In operation S51, a binocular stereo image dataset is determined and includes horizontal data and vertical data of a binocular stereo image.

Image data with real scenes may be selected to form the binocular stereo image dataset. The real scenes of the selected image data may have diversified environments. For example, the binocular stereo image dataset may be obtained through a KITTI dataset co-established by the Karlsruhe Institute of Technology in Germany and the Toyota Institute of Technology in the United States. The dataset is configured to evaluate the performance of a stereo image, optical flow, visual odometry, 3D object detection, 3D tracking and other computer vision technologies under a vehicle-mounted environment. KITTI includes real image data collected from urban districts, country-sides, expressways and other scenes. Each image includes up to 15 vehicles and 30 pedestrians and further includes various degrees of occlusion and truncation.

In operation S52, a training dataset and a testing dataset of the parallax prediction model are determined based on the binocular stereo image dataset.

The obtained binocular stereo image dataset may be divided according to a dichotomous proportional relation. For example, the training dataset and the testing dataset can be divided in proportion of 7:3 or 8:2. Thus, the training dataset and the testing dataset may be obtained.

In operation S53, convolutional neural network training is performed on the training dataset to obtain a parallax prediction training model.

A framework structure of a deep neural network, e.g., DispNet, may be constructed, as shown in FIG. 6. A convolutional neural network can calculate parallaxes between any image data pair. When the parallaxes of each image data pair are calculated, a horizontal parallax and a vertical parallax can be respectively calculated. The parallax prediction training model capable of outputting the horizontal parallax and the vertical parallax may be obtained.

Referring back to FIG. 5, in operation S54, a loss function is determined. The parallax prediction model may be detected according to the loss function and the testing dataset to obtain a target viewpoint generation parameter.

A parallax view obtained and output based on the parallax prediction training model obtained above may be compared with an existing parallax view. An error between the parallax view obtained and output by the parallax prediction training model and the existing parallax view may be determined, and the loss function may be determined. An output result of the parallax training model may be detected based on the determined loss function and the testing dataset obtained above to determine a target viewpoint generation parameter denoted by α, where the value range of α is 0≤α≤1. The determined target viewpoint generation parameter α is configured to determine whether the target view of the target viewpoint is closer to the first original image or second original image.

Under the target viewpoint generation parameter α, pixel coordinate relationships between a pixel coordinate of a target viewpoint and a pixel of the target viewpoint in original image data are as follows:

$$X_t^\alpha = X_S - DISP_h^\alpha$$

$$Y_t^\alpha = Y_S - DISP_v^\alpha$$

where $X_t^\alpha$ is a horizontal coordinate of the target viewpoint under the target viewpoint generation parameter α, $Y_t^\alpha$ is a vertical coordinate of the target viewpoint under the target viewpoint generation parameter α, $X_S$ a horizontal coordinate of a pixel corresponding to the pixel of the target viewpoint in the center of the original image data, $DISP_h^\alpha$ is a horizontal parallax under the target viewpoint generation parameter α, $Y_S$ is a vertical coordinate of the pixel corresponding to the pixel the target viewpoint in the center of the original image data, and $DISP_v^\alpha$ is a vertical parallax under the target viewpoint generation parameter α.

$DISP_v^\alpha$ may also be denoted as $\alpha DISP_v$, $DISP_h^\alpha$ may also be denoted as $\alpha DISP_h$.

In operation S55, the parallax prediction training model is tested, e.g., debugged, based on the loss function and the target viewpoint generation parameter to obtain the parallax prediction model.

Based on the situation that the loss function and the target viewpoint generation parameter determined above are set into the parallax prediction training model, the parallax prediction model capable of predicting the horizontal parallax and the vertical parallax between the image data pair may be obtained.

In an exemplary embodiment, the loss function may be determined through the following function.

For example, the loss function consists of a mean absolute error (MAE), a pixel point error and a structural similarity index measure (SSIM) between a binocular stereo image data parallax output by the parallax prediction model and a binocular stereo image data parallax in the training dataset.

The loss function may be denoted by the following functional expression:

$$L = \frac{1}{N} \sum \left[ \lambda_1 (MAE(S, G)) - \lambda_2 (PSNR(S, G)) + \lambda_3 \left( \frac{1 - SSIM(S, G)}{2} \right) \right]$$

MAE is the MAE between the binocular stereo image data parallax output by the parallax prediction model and the binocular stereo image data parallax in the training dataset. PSNR is the pixel point error, namely the Peak Signal to Noise Ratio (PSNR). SSIM is the structural similarity index measure. S is a pixel in a predicted parallax view. G is a pixel in an actual parallax view. $\lambda_1$ is a weighted value of the MAE between the binocular stereo image data parallax output by the parallax prediction model and the binocular stereo image data parallax in the training dataset. $\lambda_2$ is a weighted value of the pixel point error. $\lambda_3$ is a weighted value of the SSIM.

The MAE may be denoted by the following functional expression:

$$MAE = \frac{1}{W \times H} \sum_{x=1}^{W} \sum_{y=1}^{H} |S(x, y) - G(x, y)|$$

where W is the widths of images in the binocular stereo image dataset, H is the heights of the images in the binocular stereo image dataset, S(x,y) is the coordinates of the pixels in the predicted parallax view, and G(x,y) is the coordinates of the pixels in the actual parallax view.

The pixel point error, namely image quality evaluation based on error sensitivity, is an image objective evaluation index, namely the PSNR. The larger a numerical value is, the less the distortion is. The PSNR is denoted by the following functional expression:

$$PSNR = 10 \times \log_{10} \left( \frac{(2^n - 1)^2}{MSE} \right)$$

where MSE is a mean square error between the binocular stereo image data parallax output by the parallax prediction model and the binocular stereo image data parallax in the training dataset, and n is the bit number of each pixel.

The mean square error between the binocular stereo image data parallax output by the parallax prediction model and the binocular stereo image data parallax in the training dataset is denoted by the following functional expression:

$$MSE = \frac{1}{W \times H} \sum_{x=1}^{W} \sum_{y=1}^{H} (S(x, y) - G(x, y))^2$$

The SSIM is a full-reference image quality evaluation index and can be used to measure similarity of images from three aspects including brightness, contrast and structure. The value range of the SSIM is [0,1]. The larger the value of the SSIM is, the less the distortion of the image is. The SSIM is denoted by the following functional expression:

$$SSIM(S, G) = I(S, G) * C(S, G) * St(S, G)$$

where I is the brightness, C is the contrast, St is the structure, S is pixels in a predicted parallax view, and G is pixels in an actual parallax view.

The brightness I is denoted by the following functional expression:

$$I(S, G) = \frac{2\mu_S \mu_G + C_1}{\mu_S^2 + \mu_G^2 + C_1}$$

where $\mu_S$ is a mean value of the pixels in the predicted parallax view, $\mu_G$ is a mean value of the pixels in the actual parallax view, and $C_1$ is a constant.

The contrast C is denoted by the following functional expression:

$$C(S, G) = \frac{2\sigma_S \sigma_G + C_2}{\sigma_S^2 + \sigma_G^2 + C_2}$$

where $\sigma_S$ is a variance of the pixels in the predicted parallax view, $\sigma_G$ is a variance of the pixels in the actual parallax view, and $C_2$ is a constant.

The structure St is denoted by the following functional expression:

$$St(S, G) = \frac{\sigma_{SG} + C_3}{\sigma_X \sigma_Y + C_3}$$

Where $\sigma_{SG}$ is a covariance of the pixels in the predicated parallax view and the pixels in the actual parallax view, $\sigma_x$ is a horizontal covariance of the pixels in the predicted parallax view and the pixels in the actual parallax view, $\sigma_Y$ is a vertical covariance of the pixels in the predicated parallax view and the pixels in the actual parallax view, and $C_3$ is a constant.

Figure 7:
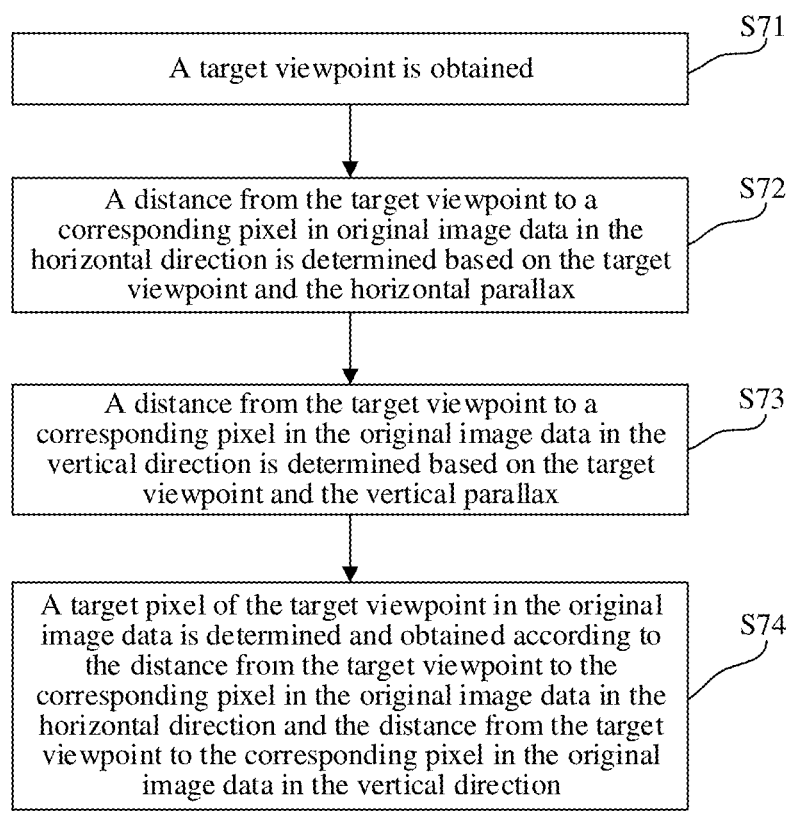
FIG. 7 is a flowchart illustrating a method for synthesizing an omni-directional parallax view according to an exemplary embodiment.

FIG. 7 is a flowchart illustrating a method for synthesizing an omni-directional parallax view according to an exemplary embodiment. As shown in FIG. 7, the obtaining a target pixel of a target viewpoint in original image data based on a horizontal parallax and a vertical parallax in operation S13 (FIG. 1) includes operation S71 to operation S74.

In operation S71, a target viewpoint is obtained.

In the embodiment, the target viewpoint may be determined on a base line between an original image data pair, the target viewpoint may be obtained, and pixel coordinates of the target viewpoint may be further obtained.

In operation S72, a distance from the target viewpoint to a corresponding pixel in original image data in the horizontal direction is determined based on the target viewpoint and the horizontal parallax.

The distance from the target viewpoint to the corresponding pixel in the original image data in the horizontal direction, which is a distance that the target viewpoint needs to move in the horizontal direction, may be determined according to pixel coordinates of the target viewpoint and the obtained horizontal parallax.

In operation S73, a distance from the target viewpoint to a corresponding pixel in the original image data in the vertical direction is determined based on the target viewpoint and the vertical parallax.

The distance from the target viewpoint to the corresponding pixel in the original image data in the vertical direction may be determined based on the target pixel coordinates of the target viewpoint and the obtained vertical parallax.

In operation S74, a target pixel of the target viewpoint in the original image data is determined and obtained according to the distance from the target viewpoint to the corresponding pixel in the original image data in the horizontal direction and the distance from the target viewpoint to the corresponding pixel in the original image data in the vertical direction.

Target pixel coordinates in the original image data and corresponding to the pixel coordinates of the target view may be determined according to the horizontal distance and the vertical distance from the target viewpoint to the corresponding pixel of the original image data. The target pixel is determined and obtained based on the target pixel coordinates.

After the target viewpoint is obtained according to the above method, the pixel coordinates of the target viewpoint may be determined. Coordinates of the corresponding pixel of the target viewpoint in the original image data may be calculated based on the horizontal parallax and the vertical parallax output according to a parallax prediction model. In the embodiment, a first original image in the original image data pair is selected as an example. The pixel, in the first original image, corresponding to the target viewpoint pixel may be calculated based on the predicted horizontal parallax and vertical parallax. The target pixel of the target viewpoint may be obtained.

Figure 8:
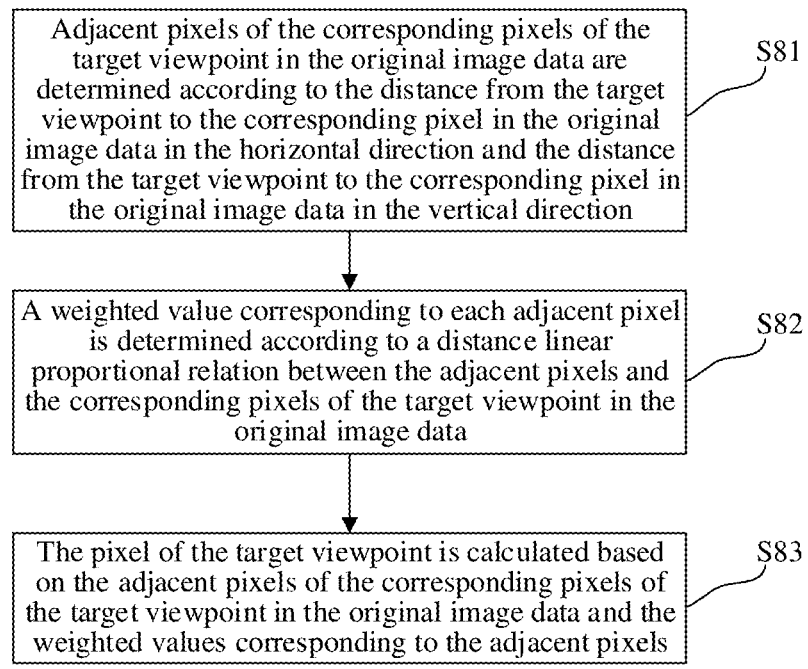
FIG. 8 is a flowchart illustrating a method for synthesizing an omni-directional parallax view according to an exemplary embodiment.

FIG. 8 is a flowchart illustrating a method for synthesizing an omni-directional parallax view according to an exemplary embodiment. As shown in FIG. 8, calculating and obtaining a corresponding pixel of a target viewpoint in original image data according to a distance from the target viewpoint to the corresponding pixel in the original image data in the horizontal direction and a distance from the target viewpoint to the corresponding pixel in the original image data in the vertical direction includes operation S81 and operation S83.

In operation S81, adjacent pixels of the corresponding pixels of the target viewpoint in the original image data are determined according to the distance from the target viewpoint to the corresponding pixel in the original image data in the horizontal direction and the distance from the target viewpoint to the corresponding pixel in the original image data in the vertical direction.

Pixel coordinates of the target viewpoint may be determined. By calculating pixel coordinates of the target viewpoint according to a horizontal parallax and a vertical parallax, pixel coordinates of the target viewpoint in original images may be obtained and may be denoted by the following formula:

$$P_{(X_t,Y_t)}^{t} = P_{(X_t+DISP_h, Y_t+DISP_v)}^{S} = P_{(X_S,Y_S)}$$

where $P_{(X_t,Y_t)}^{t}$ is a pixel coordinate of a target view, $DISP_h$ is a horizontal parallax, $DISP_v$ is a vertical parallax, $P_{(X_S,Y_S)}$ is a corresponding pixel coordinate in the original image data, and $P_{(X_t+DISP_h, Y_t+DISP_v)}^{S}$ is a coordinate of a pixel coordinate of an original image based on a pixel coordinate of the target view.

After the corresponding pixel coordinates of the target pixel in the original image data are determined, four pixels adjacent to the corresponding pixel coordinates of the target pixel in the original image data may be determined through a bilinear interpolation method. Coordinates of four adjacent pixels, namely the first adjacent pixel $P_{(\lfloor X_S \rfloor, \lfloor Y_S \rfloor)}^{S}$, the second adjacent pixel $P_{(\lfloor X_S \rfloor, \lceil Y_S \rceil)}^{S}$, the third adjacent pixel $P_{(\lceil X_S \rceil, \lfloor Y_S \rfloor)}^{S}$, and the fourth adjacent pixel $P_{(\lceil X_S \rceil, \lceil Y_S \rceil)}^{S}$, may be obtained.

In operation S82, a weighted value corresponding to each adjacent pixel is determined according to a distance linear proportional relation between the adjacent pixels and the corresponding pixels of the target viewpoint in the original image data, where the sum of the weighted values corresponding to all the adjacent pixels is 1.

The weighted values of the four adjacent pixels may be determined and may be the first weighted value $W_1$, the second weighted value $W_2$, the third weighted value $W_3$ and the fourth weighted value $W_4$, respectively. A proportional relation among the four weighted values may be determined according to distances from the four adjacent pixels to the pixel corresponding to the target pixel in the original image data, where $W_1+W_2+W_3+W_4=1$.

In operation S83, the pixel of the target viewpoint is calculated based on the adjacent pixels of the corresponding pixels of the target viewpoint in the original image data and the weighted values corresponding to the adjacent pixels.

After adjacent pixel points are determined, the pixel of the target viewpoint may be calculated through a target viewpoint pixel calculation formula, which is calculated according to the adjacent pixels of the corresponding pixels of the target viewpoint in the original image data and the weighted values corresponding to the adjacent pixels.

For example, the target viewpoint pixel calculation formula calculated according to the adjacent pixels of the corresponding pixels of the target viewpoint in the original image data and the weighted values corresponding to the adjacent pixels is as follows:

$$P_{(X_t,Y_t)}{}^t = W_1 P_{(\lfloor X_t+DISP_h \rfloor, \lfloor Y_t+DISP_v \rfloor)}{}^S + W_2$$
$$P_{(\lceil X_t+DISP_h \rceil, \lfloor Y_t+DISP_v \rfloor)}{}^S + W_3$$
$$P_{(\lfloor X_t+DISP_h \rfloor, \lceil Y_t+DISP_v \rceil)}{}^S + W_4$$
$$P_{(\lceil X_t+DISP_h \rceil, \lceil Y_t+DISP_v \rceil)}{}^S$$

where $P_{(X_t,Y_t)}{}^t$ is a synthesis view of the target viewpoint, $W_1$ is a pixel weighted value of a first adjacent point of the target viewpoint, $W_2$ is a pixel weighted value of a second adjacent point of the target viewpoint, $W_3$ is a pixel weighted value of a third adjacent point of the target viewpoint, $W_4$ is a pixel weighted value of a fourth adjacent point of the target viewpoint, and $W_1+W_2+W_3+W_4=1$; and $P_{(\lfloor X_t+DISP_h \rfloor, \lfloor Y_t+DISP_v \rfloor)}{}^S$ is a pixel of the first adjacent point of the target viewpoint, $P_{(\lceil X_t+DISP_h \rceil, \lfloor Y_t+DISP_v \rfloor)}{}^S$ is a pixel of the second adjacent point of the target viewpoint, $P_{(\lfloor X_t+DISP_h \rfloor, \lceil Y_t+DISP_v \rceil)}{}^S$ is a pixel of the third adjacent point of the target viewpoint, and $P_{(\lceil X_t+DISP_h \rceil, \lceil Y_t+DISP_v \rceil)}{}^S$ is a pixel of the fourth adjacent point of the target viewpoint.

Embodiments of the disclosure further provide an apparatus for synthesizing an omni-directional parallax view. The apparatus for synthesizing an omni-directional parallax view may include hardware structures and/or software modules executing various functions to perform the above described methods. Each module in the apparatus embodiments below can be implemented by hardware, or software, or a combination of hardware and software. Whether a certain function is performed by hardware or computer software-driven hardware depends on specific applications.

Figure 9:
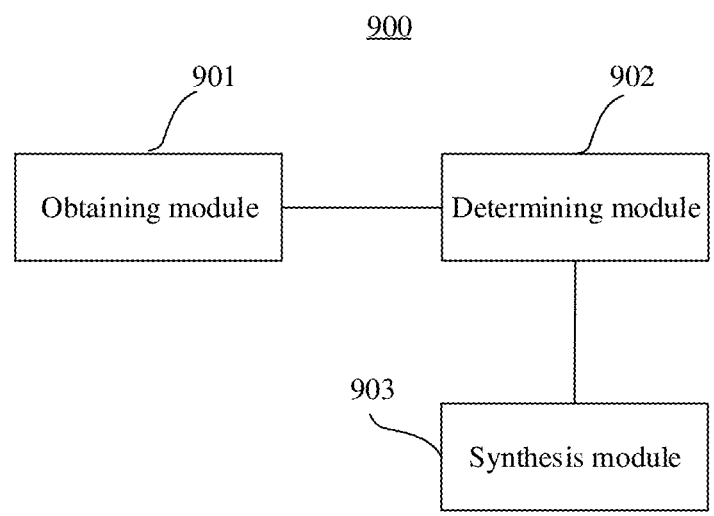
FIG. 9 is a block diagram illustrating an apparatus for synthesizing an omni-directional parallax view according to an exemplary embodiment.

FIG. 9 is a block diagram illustrating an apparatus 900 for synthesizing an omni-directional parallax view according to an exemplary embodiment. Referring to FIG. 9, the apparatus 900 includes an obtaining module 901, a determining module 902, and a synthesis module 903.

The obtaining module 901 is configured to obtain parallaxes between an original image data pair, wherein the parallaxes include a horizontal parallax and a vertical parallax. The determining module 902 is configured to determine a target viewpoint based on a base line between the original image data pair. The obtaining module is further configured to obtain a target pixel of the target viewpoint in original image data based on the horizontal parallax and the vertical parallax. The synthesis module 903 is configured to synthesize a target view of the target viewpoint based on the target pixel.

In the apparatus 900, a pixel corresponding to a pixel of the target viewpoint in the original image data determined based on the horizontal parallax and the vertical parallax may improve the accuracy of determining the corresponding pixel of the pixel of the target viewpoint in the original image data and further improve the accuracy of the target view.

In an exemplary embodiment, the obtaining module 901 may obtain the parallaxes between the original image data pair in the following manners.

The original image data pair may be obtained; and original image data pair may be input into a pre-constructed parallax prediction model to obtain the horizontal parallax and the vertical parallax between the original data pair.

In an exemplary embodiment, the apparatus 900 may further include a constructing module which pre-constructs a parallax prediction model in the following manners.

A binocular stereo image dataset may be determined, where the binocular stereo image dataset includes horizontal data and vertical data of a binocular stereo image. A training dataset and a testing dataset of the parallax prediction model may be determined based on the binocular stereo image dataset. Deep neural network training may be performed on the training dataset to obtain a parallax prediction training model. A loss function may be determined, and the parallax prediction model may be detected according to the loss function and the testing dataset to obtain a target viewpoint generation parameter. The parallax prediction training model may be debugged based on the loss function and the target viewpoint generation parameter to obtain the parallax prediction model.

In an exemplary embodiment, the determining module 902 is further configured to: determine the loss function based on an MAE, a pixel point error and an SSMI between a binocular stereo image data parallax output based on the obtained parallax prediction model and a binocular stereo image data parallax in the training dataset.

In an exemplary embodiment, the determining module 902 may determine the pixel of the target viewpoint in the original image data in the following manners.

The target viewpoint may be obtained. A distance from the target viewpoint to a corresponding pixel in the original image data in the horizontal direction may be determined based on the target viewpoint and the horizontal parallax. A distance from the target viewpoint to a corresponding pixel in the original image data in the vertical direction may be determined based on the target viewpoint and the vertical parallax. The corresponding pixel of the target viewpoint in the original image data may be determined and obtained according to the distance from the target viewpoint to the corresponding pixel in the original image data in the horizontal direction and the distance from the target viewpoint to the corresponding pixel in the original image data in the vertical direction.

In the exemplary embodiment, the determining module 902 may determine the corresponding pixel of the target viewpoint in the original image data in the following manners.

Adjacent pixels of the corresponding pixel of the target viewpoint in the original image data may be determined according to the distance from the target viewpoint to the corresponding pixel in the original image data in the horizontal direction and the distance from the target viewpoint to the corresponding pixel in the original image data in the vertical direction; a weighted value corresponding to each adjacent pixel is determined according to a distance linear proportional relation between the adjacent pixels and the corresponding pixels of the target viewpoint in the original image data. The sum of the weighted values corresponding to all the adjacent pixels is 1. The target pixel corresponding to the target viewpoint may be calculated according to the adjacent pixels of the corresponding pixels of the target viewpoint in the original image data and the weighted values corresponding to the adjacent pixels.

In the exemplary embodiment, the determining module 902 further includes a calculating unit which determines the target pixel in the following manner:

$$P_{(X_t,Y_t)}{}^t = W_1 P_{(\lfloor X_t+DISP_h \rfloor, \lfloor Y_t+DISP_v \rfloor)}{}^S + W_2$$
$$P_{(\lceil X_t+DISP_h \rceil, \lfloor Y_t+DISP_v \rfloor)}{}^S + W_3$$
$$P_{(\lfloor X_t+DISP_h \rfloor, \lceil Y_t+DISP_v \rceil)}{}^S + W_4$$
$$P_{(\lceil X_t+DISP_h \rceil, \lceil Y_t+DISP_v \rceil)}{}^S$$

where $P_{(X_t,Y_t)}{}^t$ is a synthesis view of the target viewpoint, $W_1$ is a pixel weighted value of a first adjacent point of the target viewpoint, $W_2$ is a pixel weighted value of a second adjacent point of the target viewpoint, $W_3$ is a pixel weighted value of a third adjacent point of the target viewpoint, $W_4$ is a pixel weighted value of a fourth adjacent point of the target viewpoint, and $W_1+W_2+W_3+W_4=1$; and $P_{(\lfloor X_t+DISP_h \rfloor, \lfloor Y_t+DISP_v \rfloor)}^S$ is a pixel of the first adjacent point of the target viewpoint, $P_{(\lceil X_t+DISP_h \rceil, \lfloor Y_t+DISP_v \rfloor)}^S$ is a pixel of the second adjacent point of the target viewpoint, $P_{(\lfloor X_t+DISP_h \rfloor, \lceil Y_t+DISP_v \rceil)}^S$ is a pixel of the third adjacent point of the target viewpoint, and $P_{(\lceil X_t+DISP_h \rceil, \lceil Y_t+DISP_v \rceil)}^S$ is a pixel of the fourth adjacent point of the target viewpoint.

With respect to the apparatus in the above embodiments, specific manners for performing operations by the modules therein have been described in detail in the method embodiments, which will not be repeated herein.

Figure 10:
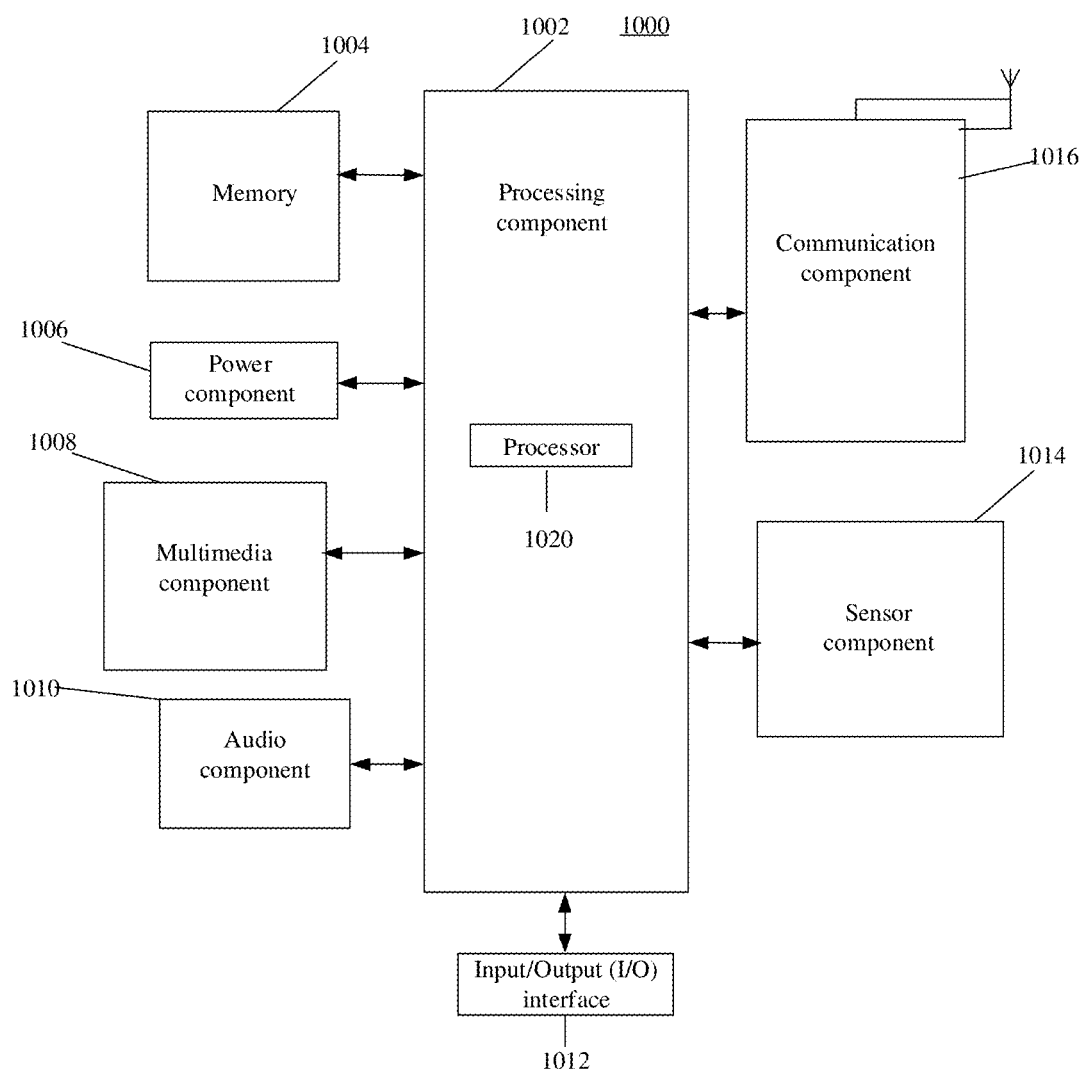
FIG. 10 is a block diagram illustrating an apparatus according to an exemplary embodiment.

FIG. 10 is a block diagram illustrating an apparatus 1000 for omni-directional parallax view synthesis according to an exemplary embodiment. For example, the apparatus 1000 may be a mobile phone, a computer, a digital broadcasting terminal, a message transceiver device, a game console, a tablet device, a medical device, a fitness device, a personal digital assistant, and the like.

Referring to FIG. 10, the apparatus 1000 may include one or more of the following components: a processing component 1002, memory 1004, a power component 1006, a multimedia component 1008, an audio component 1010, an Input/Output (I/O) interface 1012, a sensor component 1014, and a communication component 1016.

The processing component 1002 generally controls overall operations of the apparatus 1000, such as operations related to displaying, telephone calls, data communications, camera operations, and recording operations. The processing component 1002 may include one or more processors 1020 to execute instructions to complete all or part of the operations of the method described above. In addition, the processing component 1002 may include one or more modules to facilitate the interaction between the processing component 1002 and other components. For example, the processing component 1002 may include a multimedia module to facilitate the interaction between the multimedia component 1008 and the processing component 1002.

The memory 1004 is configured to store various types of data to support the operation of the apparatus 1000. Examples of such data include the instructions for any application program or method operated on the apparatus 1000, contact data, phone book data, messages, pictures, videos, and the like. The memory 1004 may be implemented by any type of volatile or non-volatile storage devices or a combination thereof, such as a Static Random Access Memory (SRAM), an Electrically Erasable Programmable Read-Only Memory (EEPROM), a Programming Read-Only Memory (EPROM), a Programmable Read-Only Memory (PROM), a Read-Only Memory (ROM), a magnetic memory, a flash memory, a magnetic disk or an optical disk.

The power component 1006 may provide power to the various components of the apparatus 1000. The power component 1006 may include a power management system, one or more power supplies, and other components associated with generation, management, and distribution of power for the apparatus 1000.

The multimedia component 1008 may include a screen that provides an output interface between the apparatus 1000 and a user. In some embodiments, the screen may include an LCD and a TP. If the screen includes the TP, the screen may be implemented as a touch screen to receive an input signal from the user. The TP includes one or more touch sensors to sense touch, swipe, and gestures on the TP. The touch sensor may not only sense a boundary of a touch or swipe action, but also detect duration and pressure related to the touch or swipe operation. In some embodiments, the multimedia component 1008 includes a front camera and/or a rear camera. The front camera and/or the rear camera may receive external multimedia data while the apparatus 1000 is in an operation mode, such as a photographing mode or a video mode. Each of the front camera and the rear camera may be a fixed optical lens system or may have a focal length and an optical zoom capability.

The audio component 1010 is configured to output and/or input audio signals. For example, the audio component 1010 includes a microphone (MIC), and the microphone is configured to receive an external audio signal when the apparatus 1000 is in an operation mode, such as a calling mode, a recording mode, and a voice identification mode. The received audio signals may be further stored in the memory 1004 or transmitted via the communication component 1016. In some embodiments, the audio component 1010 may further include a speaker to output the audio signals.

The I/O interface 1012 may provide an interface between the processing component 1002 and peripheral interface modules, which may be keyboards, click wheels, buttons, etc. These buttons may include, but not limited to, a home button, a volume button, a start button and a lock button.

The sensor component 1014 may include one or more sensors configured to provide various aspects of state assessment to the apparatus 1000. For example, the sensor component 1014 may detect a powered-on/off status of the apparatus 1000, and relative positioning of the components, such as a display and a keypad of the apparatus 1000. The sensor component 1014 may also detect a change in position of the apparatus 1000 or a component of the apparatus 1000, a presence or absence of user contact with the apparatus 1000, an orientation or an acceleration/deceleration of the apparatus 1000, and a change in temperature of the apparatus 1000. The sensor component 1014 may include a proximity sensor configured to detect the presence of objects nearby without any physical contact. The sensor component 1014 may also include light sensors, such as CMOS or CCD image sensors, for use in imaging applications. In some embodiments, the sensor component 1014 may also include an acceleration sensor, a gyroscope sensor, a magnetic sensor, a pressure sensor, or a temperature sensor.

The communication component 1016 is configured to facilitate wired or wireless communications between the apparatus 1000 and other devices. The apparatus 1000 may have access to a wireless network based on a communication standard, such as WiFi, 4G or 5G, or a combination thereof. In one exemplary embodiment, the communication component 1016 receives broadcast signals or broadcast related information from an external broadcast management system via a broadcast channel. In one exemplary embodiment, the communication component 1016 further includes an NFC module to facilitate short-range communications. In one exemplary embodiment, the communication component 1016 may be implemented based on a Radio Frequency Identification (RFID) technology, an Infrared Data Association (IrDA), an Ultra-Wide Band (UWB) technology, a Bluetooth (BT) technology and other technologies.

In an exemplary embodiment, the apparatus 1000 may be implemented by one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to perform the above method.

In an exemplary embodiment, a non-transitory computer-readable storage medium storing instructions, such as the memory 1004 storing the instructions, is provided. The instructions may be executed by the processor 1020 of the apparatus 1000 to perform the above-described methods. For example, the non-transitory computer-readable storage medium may be an ROM, a Random Access Memory (RAM), a CD-ROM, a magnetic tape, a soft disk, an optical data storage device or the like.

The technical solutions provided by the embodiments of the disclosure may have the following beneficial effects: a pixel, in original image data, corresponding to a target viewpoint pixel may be determined based on the obtained horizontal parallax and vertical parallax of the original image data, so that a target view can be synthesized, thereby improving the matching accuracy between a target image pixel and the pixel in the original image data, simplicity and convenience, and applicability.

Further, it can be understood that "and/or" describes the association relationship of the associated objects, indicates that there may be three kinds of relationships, for example, A and/or B may indicate three situations that there is A alone, there are A and B at the same time, and there is B alone. Further, it can be understood that the terms "first," "second," and the like describe various types of information, but the information should not be limited to the terms. The terms distinguish the same type of information from each other, and do not indicate a specific order or degree of importance. For example, without departing from the scope of the disclosure, first information may also be referred as second information. Similarly, second information may also be referred as first information.

It can further be understood that although the operations in the embodiments of the disclosure are described in a specific order in the accompanying drawings, it should not be understood that the operations are required to be performed in a specific order shown or in a serial order, or all the operations shown are required to be performed to obtain a desired result. In specific environments, multitasking and parallel processing may be advantageous.

Other embodiments of the disclosure will be apparent to those skilled in the art from consideration of the specification and practice of the disclosure herein. The disclosure is intended to cover any variation, use or adaptation of the disclosure following the general principles of the disclosure and including common knowledge or conventional technical means in the technical field not disclosed in the disclosure. The specification and the embodiments are considered as being exemplary only, with a true scope and spirit of the disclosure being indicated by the following claims.

It should be understood that the disclosure is not limited to the exact construction that has been described above and illustrated in the accompanying drawings, and that various modifications and changes can be made without departing from the scope thereof. The scope of the disclosure is limited only by the appended claims.

What is claimed is:

1. A method for synthesizing an omni-directional parallax view, comprising:
   obtaining parallaxes between an original image data pair, wherein the parallaxes comprise a horizontal parallax and a vertical parallax;
   determining a target viewpoint based on a base line between the original image data pair;
   obtaining a target pixel of the target viewpoint in original image data based on the horizontal parallax and the vertical parallax; and
   synthesizing a target view of the target viewpoint based on the target pixel.

2. The method according to claim 1, wherein obtaining the parallaxes between the original image data pair comprises:
   obtaining the original image data pair; and
   inputting the original image data pair into a pre-constructed parallax prediction model to obtain the horizontal parallax and the vertical parallax between the original data pair.

3. The method according to claim 2, further comprising pre-constructing the parallax prediction model by:
   determining a binocular stereo image dataset, wherein the binocular stereo image dataset comprises horizontal data and vertical data of a binocular stereo image;
   determining a training dataset and a testing dataset of the parallax prediction model based on the binocular stereo image dataset;
   performing deep neural network training on the training dataset to obtain a parallax prediction training model;
   determining a loss function;
   detecting the parallax prediction model according to the loss function and the testing dataset to obtain a target viewpoint generation parameter; and
   testing the parallax prediction training model based on the loss function and the target viewpoint generation parameter to obtain the parallax prediction model.

4. The method according to claim 3, wherein determining the loss function comprises:
   determining the loss function based on a mean absolute error (MAE), a pixel point error and a structural similarity index measure (SSIM) between a binocular stereo image data parallax output based on the obtained parallax prediction model and a binocular stereo image data parallax in the training dataset.

5. The method according to claim 1, wherein determining the target pixel of the target viewpoint in the original image data based on the horizontal parallax and the vertical parallax comprises:
   obtaining the target viewpoint;
   determining a distance from the target viewpoint to a corresponding pixel in the original image data in a horizontal direction based on the target viewpoint and the horizontal parallax;
   determining a distance from the target viewpoint to a corresponding pixel in the original image data in a vertical direction based on the target viewpoint and the vertical parallax; and
   obtaining the target pixel of the target viewpoint in the original image data according to the distance from the target viewpoint to the corresponding pixel in the original image data in the horizontal direction and the distance from the target viewpoint to the corresponding pixel in the original image data in the vertical direction.

6. The method according to claim 5, wherein obtaining the target pixel of the target viewpoint in the original image data according to the distance from the target viewpoint to the corresponding pixel in the original image data in the horizontal direction and the distance from the target viewpoint to the corresponding pixel in the original image data in the vertical direction comprises:
   determining adjacent pixels of the corresponding pixels of the target viewpoint in the original image data according to the distance from the target viewpoint to the corresponding pixel in the original image data in the horizontal direction and the distance from the target viewpoint to the corresponding pixel in the original image data in the vertical direction;
   determining a weighted value corresponding to each of the adjacent pixels according to a distance linear proportional relation between the adjacent pixels and the corresponding pixels of the target viewpoint in the original image data, wherein a sum of weighted values corresponding to all the adjacent pixels is 1; and calculating the target pixel corresponding to the target viewpoint based on the adjacent pixels of the corresponding pixels of the target viewpoint in the original image data and the weighted values corresponding to the adjacent pixels.

7. The method according to claim 6, wherein calculating the target pixel corresponding to the target viewpoint based on the adjacent pixels of the corresponding pixels of the target viewpoint in the original image data and the weighted values corresponding to the adjacent pixels is implemented by:

$$P_{(X_t,Y_t)}^{t} = W_1 P_{(\lfloor X_t+DISP_h \rfloor, \lfloor Y_t+DISP_v \rfloor)}^{S} + W_2$$
$$P_{(\lfloor X_t+DISP_h \rfloor, \lceil Y_t+DISP_v \rceil)}^{S} + W_3$$
$$P_{(\lceil X_t+DISP_h \rceil, \lfloor Y_t+DISP_v \rfloor)}^{S} + W_4$$
$$P_{(\lceil X_t+DISP_h \rceil, \lceil Y_t+DISP_v \rceil)}^{S}$$

wherein $P_{(X_t,Y_t)}^{t}$ is a synthesis view of the target viewpoint, $W_1$ is a pixel weighted value of a first adjacent point of the target viewpoint, $W_2$ is a pixel weighted value of a second adjacent point of the target viewpoint, $W_3$ is a pixel weighted value of a third adjacent point of the target viewpoint, $W_4$ is a pixel weighted value of a fourth adjacent point of the target viewpoint, and $W_1+W_2+W_3+W_4=1$; and $P_{(\lfloor X_t+DISP_h \rfloor, \lfloor Y_t+DISP_v \rfloor)}^{S}$ is a pixel of the first adjacent point of the target viewpoint, $P_{(\lfloor X_t+DISP_h \rfloor, \lceil Y_t+DISP_v \rceil)}^{S}$ is a pixel of the second adjacent point of the target viewpoint, $P_{(\lceil X_t+DISP_h \rceil, \lfloor Y_t+DISP_v \rfloor)}^{S}$ is a pixel of the third adjacent point of the target viewpoint, and $P_{(\lceil X_t+DISP_h \rceil, \lceil Y_t+DISP_v \rceil)}^{S}$ is a pixel of the fourth adjacent point of the target viewpoint.

8. An apparatus for synthesizing an omni-directional parallax view, comprising:
a processor; and
a memory configured to store instructions executable by the processor;
wherein the processor is configured to:
obtain parallaxes between an original image data pair, wherein the parallaxes comprise a horizontal parallax and a vertical parallax;
determine a target viewpoint based on a base line between the original image data pair;
obtain a target pixel of the target viewpoint in original image data based on the horizontal parallax and the vertical parallax; and
synthesize a target view of the target viewpoint based on the target pixel.

9. The apparatus according to claim 8, wherein the processor is configured to obtain the parallaxes between the original image data pair by:
obtaining the original image data pair; and
inputting the original image data pair into a pre-constructed parallax prediction model to obtain the horizontal parallax and the vertical parallax between the original data pair.

10. The apparatus according to claim 9, wherein the processor is further configured to pre-construct the parallax prediction model by:
determining a binocular stereo image dataset, wherein the binocular stereo image dataset comprises horizontal data and vertical data of a binocular stereo image;
determining a training dataset and a testing dataset of the parallax prediction model based on the binocular stereo image dataset;
performing deep neural network training on the training dataset to obtain a parallax prediction training model;
determining a loss function;
detecting the parallax prediction model according to the loss function and the testing dataset to obtain a target viewpoint generation parameter; and
testing the parallax prediction training model based on the loss function and the target viewpoint generation parameter to obtain the parallax prediction model.

11. The apparatus according to claim 10, wherein the processor is further configured to:
determine the loss function based on a mean absolute error (MAE), a pixel point error and a structural similarity index measure (SSIM) between a binocular stereo image data parallax output based on the obtained parallax prediction model and a binocular stereo image data parallax in the training dataset.

12. The apparatus according to claim 8, wherein the processor is configured to determine the target pixel of the target viewpoint in the original image data by:
obtaining the target viewpoint;
determining a distance from the target viewpoint to a corresponding pixel in the original image data in a horizontal direction based on the target viewpoint and the horizontal parallax;
determining a distance from the target viewpoint to a corresponding pixel in the original image data in a vertical direction based on the target viewpoint and the vertical parallax; and
obtaining the target pixel of the target viewpoint in the original image data according to the distance from the target viewpoint to the corresponding pixel in the original image data in the horizontal direction and the distance from the target viewpoint to the corresponding pixel in the original image data in the vertical direction.

13. The apparatus according to claim 12, wherein the processor is configured to the target pixel of the target viewpoint in the original image data by:
determining adjacent pixels of the corresponding pixels of the target viewpoint in the original image data according to the distance from the target viewpoint to the corresponding pixel in the original image data in the horizontal direction and the distance from the target viewpoint to the corresponding pixel in the original image data in the vertical direction;
determining a weighted value corresponding to each of the adjacent pixels according to a distance linear proportional relation between the adjacent pixels and the corresponding pixels of the target viewpoint in the original image data, wherein the sum of the weighted values corresponding to all the adjacent pixels is 1; and
calculating the target pixel corresponding to the target viewpoint based on the adjacent pixels of the corresponding pixels of the target viewpoint in the original image data and the weighted values corresponding to the adjacent pixels.

14. The apparatus according to claim 13, wherein the processor is further configured to determine the target pixel of the target viewpoint by:

$$P_{(X_t,Y_t)}^{t} = W_1 P_{(\lfloor X_t+DISP_h \rfloor, \lfloor Y_t+DISP_v \rfloor)}^{S} + W_2$$
$$P_{(\lfloor X_t+DISP_h \rfloor, \lceil Y_t+DISP_v \rceil)}^{S} + W_3$$
$$P_{(\lceil X_t+DISP_h \rceil, \lfloor Y_t+DISP_v \rfloor)}^{S} + W_4$$
$$P_{(\lceil X_t+DISP_h \rceil, \lceil Y_t+DISP_v \rceil)}^{S}$$

wherein $P_{(X_t,Y_t)}^{t}$ is a synthesis view of the target viewpoint, $W_1$ is a pixel weighted value of a first adjacent point of the target viewpoint, $W_2$ is a pixel weighted value of a second adjacent point of the target viewpoint, $W_3$ is a pixel weighted value of a third adjacent point of the target viewpoint, $W_4$ is a pixel weighted value of a fourth adjacent point of the target viewpoint, and $W_1+W_2+W_3+W_4=1$; and $P_{(\lfloor X_t+DISP_h\rfloor,\lfloor Y_t+DISP_v\rfloor)}^S$ is a pixel of the first adjacent point of the target viewpoint, $P_{(\lfloor X_t+DISP_h\rfloor,\lceil Y_t+DISP_v\rceil)}^S$ is a pixel of the second adjacent point of the target viewpoint, $P_{(\lceil X_t+DISP_h\rceil,\lfloor Y_t+DISP_v\rfloor)}^S$ is a pixel of the third adjacent point of the target viewpoint, and $P_{(\lceil X_t+DISP_h\rceil,\lceil Y_t+DISP_v\rceil)}^S$ is a pixel of the fourth adjacent point of the target viewpoint.

15. A non-transitory computer readable storage medium having stored therein instructions that, when executed by a processor of a device, cause the device to perform a method for synthesizing an omni-directional parallax view, the method comprising:
  obtaining parallaxes between an original image data pair, where the parallaxes comprise a horizontal parallax and a vertical parallax;
  determining a target viewpoint based on a base line between the original image data pair;
  obtaining a target pixel of the target viewpoint in original image data based on the horizontal parallax and the vertical parallax; and
  synthesizing a target view of the target viewpoint based on the target pixel.

16. The non-transitory computer readable storage medium of claim 15, wherein obtaining the parallaxes between the original image data pair comprises:
  obtaining the original image data pair; and
  inputting the original image data pair into a pre-constructed parallax prediction model to obtain the horizontal parallax and the vertical parallax between the original data pair.

17. The non-transitory computer readable storage medium of claim 16, wherein the method further comprises pre-constructing the parallax prediction model by:
  determining a binocular stereo image dataset, where the binocular stereo image dataset comprises horizontal data and vertical data of a binocular stereo image;
  determining a training dataset and a testing dataset of the parallax prediction model based on the binocular stereo image dataset;
  performing deep neural network training on the training dataset to obtain a parallax prediction training model;
  determining a loss function;
  detecting the parallax prediction model according to the loss function and the testing dataset to obtain a target viewpoint generation parameter; and
  debugging the parallax prediction training model based on the loss function and the target viewpoint generation parameter to obtain the parallax prediction model.

18. The non-transitory computer readable storage medium of claim 17, wherein determining the loss function comprises:
  determining the loss function based on a mean absolute error (MAE), a pixel point error and a structural similarity index measure (SSIM) between a binocular stereo image data parallax output based on the obtained parallax prediction model and a binocular stereo image data parallax in the training dataset.

19. The non-transitory computer readable storage medium of claim 15, wherein determining the target pixel of the target viewpoint in the original image data based on the horizontal parallax and the vertical parallax comprises:
  obtaining the target viewpoint;
  determining a distance from the target viewpoint to a corresponding pixel in the original image data in a horizontal direction based on the target viewpoint and the horizontal parallax;
  determining a distance from the target viewpoint to a corresponding pixel in the original image data in a vertical direction based on the target viewpoint and the vertical parallax; and
  obtaining the target pixel of the target viewpoint in the original image data according to the distance from the target viewpoint to the corresponding pixel in the original image data in the horizontal direction and the distance from the target viewpoint to the corresponding pixel in the original image data in the vertical direction.

20. The non-transitory computer readable storage medium of claim 19, wherein obtaining the target pixel of the target viewpoint in the original image data according to the distance from the target viewpoint to the corresponding pixel in the original image data in the horizontal direction and the distance from the target viewpoint to the corresponding pixel in the original image data in the vertical direction comprises:
  determining adjacent pixels of the corresponding pixels of the target viewpoint in the original image data according to the distance from the target viewpoint to the corresponding pixel in the original image data in the horizontal direction and the distance from the target viewpoint to the corresponding pixel in the original image data in the vertical direction;
  determining a weighted value corresponding to each of the adjacent pixels according to a distance linear proportional relation between the adjacent pixels and the corresponding pixels of the target viewpoint in the original image data, where a sum of weighted values corresponding to all the adjacent pixels is 1; and
  calculating the target pixel corresponding to the target viewpoint based on the adjacent pixels of the corresponding pixels of the target viewpoint in the original image data and the weighted values corresponding to the adjacent pixels.

* * * * *